McCormick, Erpelding and Baker.
Mower.
No. 89,324.             Patented April 27, 1869.
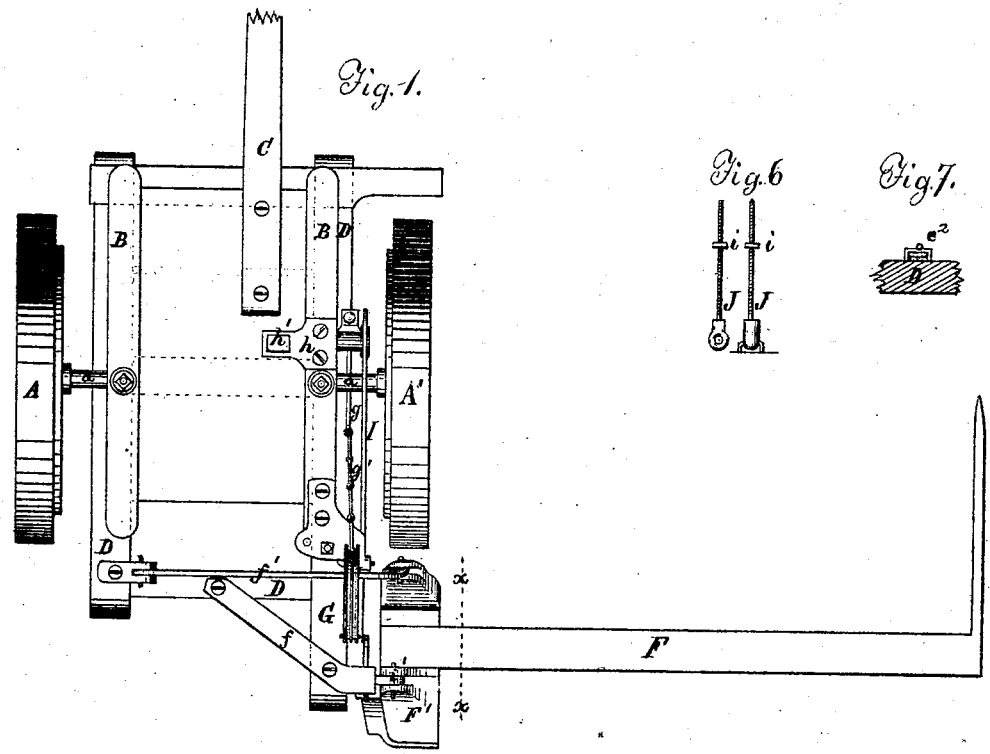
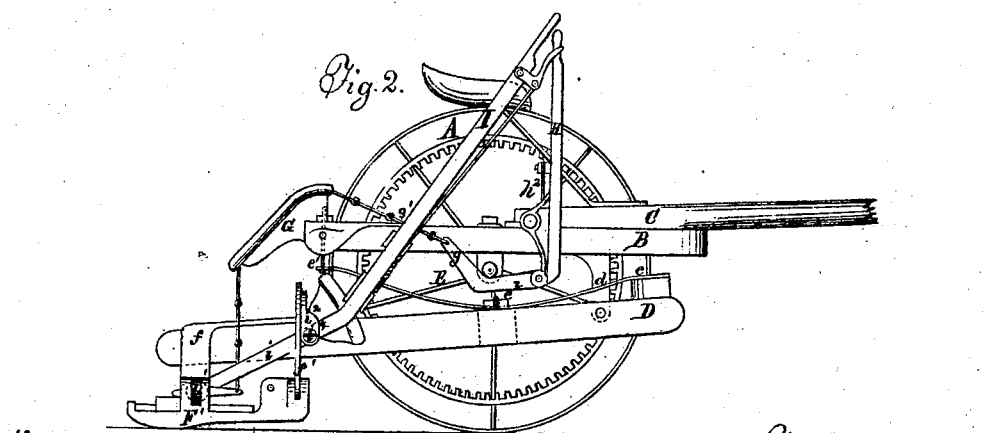

UNITED STATES PATENT OFFICE.

L. J. McCORMICK, WM. R. BAKER, AND LAMBERT ERPELDING, OF CHICAGO, ILLINOIS.

IMPROVEMENT IN HARVESTERS.

Specification forming part of Letters Patent No. 89,324, dated April 27, 1869.

*To all whom it may concern:*

Be it known that we, LEANDER J. McCORMICK, WILLIAM R. BAKER, and LAMBERT ERPELDING, all of Chicago, in the county of Cook and State of Illinois, have invented certain new and useful Improvements in Harvesters, of which the following is a full, clear, and exact description.

The first part of our invention relates to mowing-machines in which the finger-beam is hinged to a coupling-frame pivoted and vibrating upon the main frame. Its object is to relieve and regulate the pressure of the cutting apparatus upon the ground over which it slides; and our improvement consists—

First, in a novel method of combining, with the main frame of a harvester a coupling-frame hinged to the main frame, and a spring interposed between the two frames, to counteract the pressure of the cutting apparatus upon the ground.

Second, in a novel method of combining an adjusting device with said frames and spring, to regulate the pressure of the cutting apparatus on the ground.

Third, in a novel device for holding the spring in place.

The next part of our invention relates to a lever for rocking the finger-beam axially, to raise or lower the points of the guards. Its object is to facilitate the removal of the lever, to convert the machine from a mower to a reaper; and our improvement consists—

Fourth, in a novel method of constructing the lever with a fork, to embrace its pivot on the shoe, and combining this lever with a link swiveled on the same pivot by detachable fastenings.

The next part of our invention relates to the devices for raising and lowering the cutting apparatus; and our improvement consists—

Fifth, in a novel method of combining the fulcrum for a lifting-lever and a guide for the reel-driving chain in one reversible casting.

Sixth, our improvement further consists in a novel method of combining, with the lifting-lever, a spring on the lever to keep it within easy reach of the driver.

The accompanying drawings show all our improvements embodied in one machine, and that of the kind patented by us September 15, 1868, and October 27, 1868. It is obvious, however, that some of our improvements may be used without the others, and may also be adapted to machines of constructions differing from that shown.

Figure 1 represents a plan or top view of our improved machine arranged for mowing; Fig. 2, a side view of the same, partly in elevation and partly in section, at the line $x\,x$ of Fig. 1; Fig. 3, a side view of the rocking lever detached; Fig. 4, an edge view of the lower part of said lever, and Fig. 5 a side view of the lifting-lever; Fig. 6, views of the screw for holding the main and coupling frames together, and Fig. 7 a section of the flange-cap for holding the lifting-spring in its place.

In this instance two driving-wheels, A A', are shown as turning loosely on a fixed axle, $a$, mounted on a suitable main frame, B, from which a rigid tongue, C, projects. A coupling-frame, D, is pivoted to vibrate freely vertically in brackets or down-hangers $d$ on the main frame. We, by preference, pivot this frame on a counter-shaft extending across the main frame, and carrying pinions gearing into proper gear-wheels on the driving-wheels A, in the usual way, the pinions being connected with the counter-shaft by suitable backing-ratchets.

In order to carry out the first part of our invention, we secure a long plate-spring, E, at one end, $e$, to the coupling-frame, in front of its pivots $d$, and at its other end to an adjusting-screw, $e^1$, working in a bearing in the main frame. The spring is secured to the coupling-frame near its middle by a flanged plate, $e^2$, Fig. 7, firmly bolted to the coupling-frame. The overlapping flanges of this plate prevent the spring from being deflected sidewise out of its proper position by the working of the coupling-frame. More than one leaf may be used in the spring, if required. By means of the set-screw $e^1$ the rear end of the spring may be raised or lowered, thus varying the downward pressure on the front end of the coupling-frame, and correspondingly counteracting the weight of the rear end of the coupling-frame. A laterally-projecting cutting apparatus, F, is hinged to the coupling-frame by means of a stirrup, $f$, and coupling-arm $f'$, as shown in our former patents above named.

In order to carry out the next part of our invention, we pivot a strap, $i$, on the swiveling eyebolt $i^1$, which connects the shoe F with the stirrup $f$. This strap reaches to the lug $i^2$ on the coupling-arm $f'$. The rocking lever I has a yoke, $i^3$, at its lower end, as shown in dotted lines in Fig. 3, which slips over the eyebolt $i^1$. This lever is inserted between the lugs on the coupling-arm, and secured by a screw, $i^4$, passing through the lugs, the strap $i$, and the lever I, which last is thus securely held in place. A spring-detent and sector-rack, of well-known construction, hold the lever in any desired position to regulate the angle of the guards to the ground in mowing. As this lever is useless in reaping, it is removed simply by taking out the screw $i^4$, which allows the lever to be removed. The strap $i$ remains and is secured in the lugs again by the screw $i^4$. The lifting-lever H rocks on a fulcrum, $h^3$, in a bracket, $h$, having a guide, $h^1$, for the reel-chain on its opposite end. The bracket is reversible, so as to bring the lever-fulcrum outside when mowing, and the chain-guide when reaping, as shown in Fig. 1.

A spring, $h^2$, on the lever, serves to keep it in a position convenient to the hand. A link, $g$, and chain $h'$ connect this lever with the finger-beam, first passing over the rocking segment G in a manner similar to that shown in our patent of October 27, 1868.

Our machine is, of course, to be provided with a driver's seat, gearing, and cutting apparatus; but as these details form no part of the subject-matter of our claims, we deem it unnecessary to describe them in detail.

The operation of our machine as a mower will also readily be understood from the description above given, and by reference to our former patents above mentioned.

What we claim as our invention, and desire to secure by Letters Patent, is—

1. The combination, substantially as set forth, of the main frame, the rocking coupling-frame, and the interposed spring crossing the pivot of the coupling-frame, to relieve the pressure of the cutting apparatus upon the ground.

2. The combination, with the plate-spring secured to the rocking coupling-frame, of the adjusting-screw on the main frame, for the purpose specified.

3. The combination, with the spring, of the flange-plate $e^2$ on the coupling-frame, to prevent lateral deflection of the spring, as set forth.

4. The combination of the forked removable rocking lever with the link $i$, substantially as set forth.

5. The reversible bracket $h$, constructed as described.

6. The arrangement of the spring $h^2$ on the lifting-lever, as described.

In testimony whereof we have hereunto subscribed our names.

L. J. McCORMICK.
WM. R. BAKER.
LAMBERT ERPELDING.

Witnesses:
C. N. WALLACH,
JOHN J. CHEW.